(12) United States Patent
Surridge (10) Patent No.: US 8,939,490 B2
(45) Date of Patent: Jan. 27, 2015

(54) RECONFIGURABLE CARGO BED

(75) Inventor: David G. Surridge, Hickory, NC (US)

(73) Assignee: Centro, Inc., North Liberty, IA (US)

( * ) Notice: Subject to any disclaimer, the term of this patent is extended or adjusted under 35 U.S.C. 154(b) by 22 days.

(21) Appl. No.: 13/535,598

(22) Filed: Jun. 28, 2012

(65) Prior Publication Data

US 2013/0033055 A1 Feb. 7, 2013

Related U.S. Application Data

(60) Provisional application No. 61/515,201, filed on Aug. 4, 2011.

(51) Int. Cl.
*B62D 33/00* (2006.01)
*B60P 3/42* (2006.01)

(52) U.S. Cl.
CPC ...................... *B60P 3/423* (2013.01)
USPC .. 296/10; 296/26.11; 296/183.1; 296/100.06; 410/129

(58) Field of Classification Search
CPC .................................................. B62D 33/00
USPC .......... 296/183.1, 100.6, 26.04, 26.11, 26.12, 296/26.13, 26.15, 10; 410/129
See application file for complete search history.

(56) References Cited

U.S. PATENT DOCUMENTS

| | | | | |
|---|---|---|---|---|
| 6,109,847 A * | 8/2000 | Patel et al. | ...................... | 410/129 |
| 7,950,728 B2 * | 5/2011 | Plavetich | .................. | 296/193.01 |
| 8,167,072 B2 * | 5/2012 | Leonard et al. | .................. | 180/90 |
| 8,267,454 B2 * | 9/2012 | Takano et al. | ............... | 296/26.02 |
| 2008/0169674 A1 * | 7/2008 | Giles | ........................... | 296/183.1 |
| 2009/0115222 A1 * | 5/2009 | Hohnl et al. | ................ | 296/183.1 |

* cited by examiner

*Primary Examiner* — Dennis H Pedder
(74) *Attorney, Agent, or Firm* — Jason R. Sytsma; Shuttleworth & Ingersoll, PLC (57) ABSTRACT

An off-road utility vehicle with a reconfigurable cargo bed with fore and aft sections joined to the vehicle. Each section has three walls and a floor. The fore section pivots with respect to the aft section between an open position and a closed position with the fore section on top of the aft section. In the closed position, the reconfigurable cargo bed is a container with an opening in the foremost side of the container. A movable bulkhead is provided that is adapted to close the opening of the foremost side of the container, as well as being repositionable to serve as an extended surface for hauling cargo, a work bench that extends from a side of the cargo bed, or as a divider in the center of the cargo bed.

9 Claims, 12 Drawing Sheets

RECONFIGURABLE CARGO BED

This application claims priority to provisional patent application titled, "Multi-Purpose Vehicle", Ser. No. 61/515,201 filed Aug. 4, 2011. The disclosure of the provisional patent application Ser. No. 61/515,201 is hereby incorporated by reference in its entirety.

BACKGROUND

Multi-Purpose vehicles are used for a wide variety of off-road utility applications, such as moving materials including lumber, farm and ranch tasks, golf course maintenance, hunting, etc. These machines are typically characterized by a cargo bed located behind open top front seats.

The utility of such machines is often compromised due to balancing the various needs of the users. For example, the cargo bed may be shortened to accommodate back seat passengers, or a closed trunk may be provided at the expense of an open cargo bed. However, a typical user may desire on occasion to carry additional passengers, a large heavy load, or valuable contents in a closed trunk, or need a working surface and find that they cannot accomplish all tasks with the same multi-purpose vehicle.

SUMMARY

The present invention provides solutions to the problems identified by providing an improved multi-purpose vehicle. A reconfigurable cargo bed with a fore and aft section is joined to the multi-purpose vehicle. Each section has three walls and a floor. The fore section pivots with respect to the aft section between an open position and a closed position with the fore section on top of the aft section. In the closed position, the reconfigurable cargo bed is a closed container with an opening in the foremost side of the container.

A movable bulkhead is provided that is adapted to fit, among other places, in the opening of the foremost side of the container. When the container is in the open position, the bulkhead is available to be repositioned in many locations serving as an extended surface for hauling cargo, a work bench that extends off a side of the cargo bed, or the center of the cargo bed to function as a divider. The bulkhead is easily repositionable, by simply removing one or more fasteners.

These and other features will be understood from examination of the detailed description, claims, and drawings, which are part of this disclosure.

DETAILED DESCRIPTION

Figure 1:
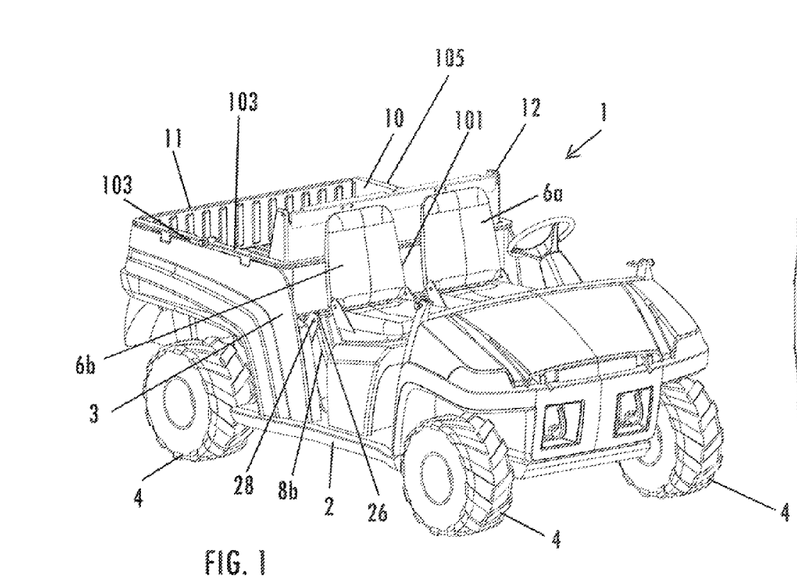
FIG. 1 is a perspective view of a multi-purpose vehicle according to the present invention with a bulkhead in the foremost position in a cargo bed.
Figure 2:
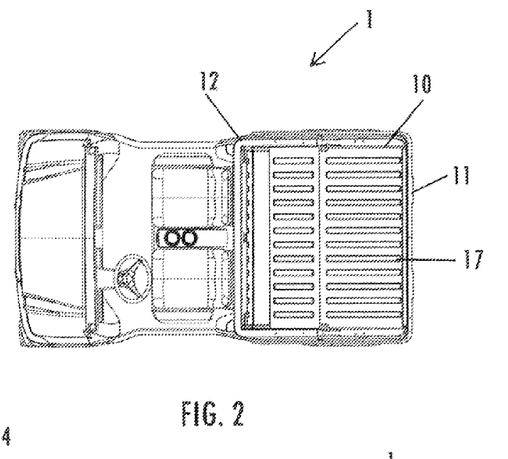
FIG. 2 is a top view of the invention shown in FIG. 1.
Figure 3:
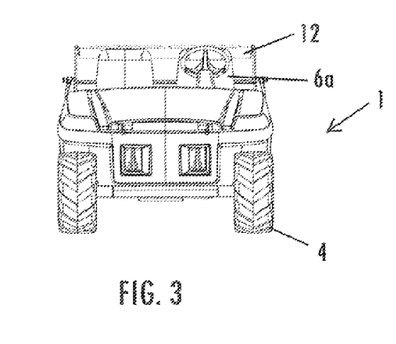
FIG. 3 is a front view of the invention shown in FIG. 1.
Figure 4:
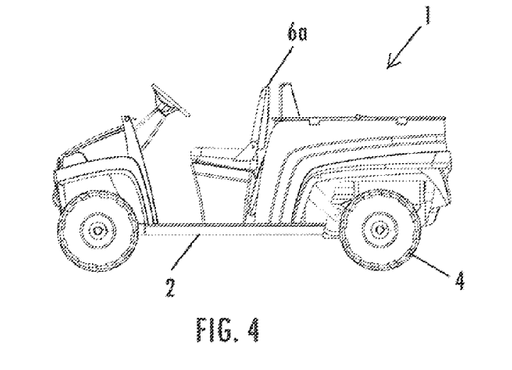
FIG. 4 is a left side view of the invention shown in FIG. 1.
Figure 9:
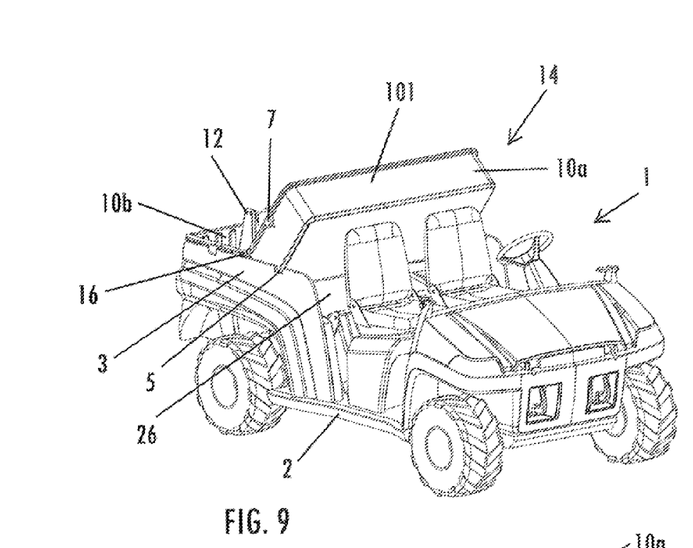
FIG. 9 is a perspective view of the invention shown in FIG. 5 with the cargo bed in an intermediate position as it is converted into a container.
Figure 10:
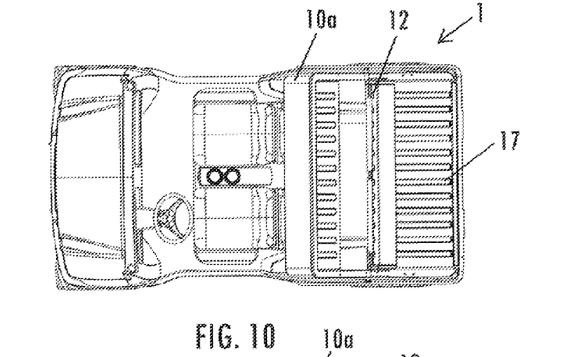
FIG. 10 is a top view of the invention shown in FIG. 9.
Figure 11:
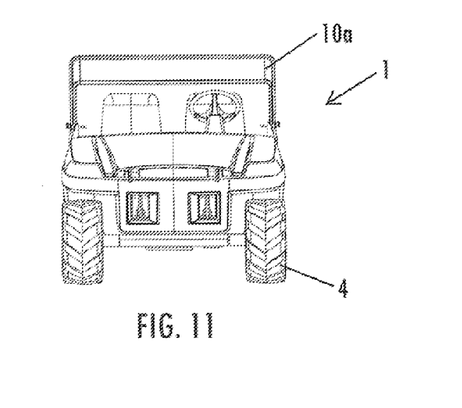
FIG. 11 is a front view of the invention shown in FIG. 9.
Figure 12:
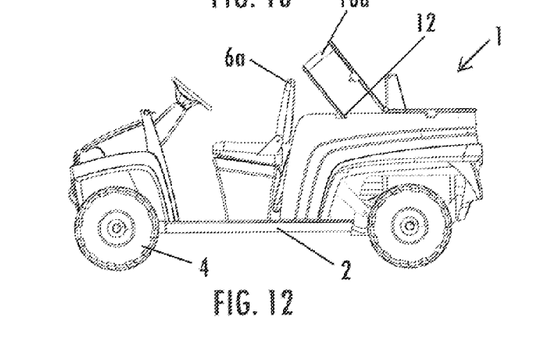
FIG. 12 is a left side view of the invention shown in FIG. 9.

FIG. 1 is a perspective view of a multi-purpose vehicle 1 quickly adaptable to numerous configurations without the need for tools. Vehicle 1 has a body 2 coupled to four wheels 4, and two front seats 6a, 6b for a driver and a passenger to sit. Body 2 is configured to fit over the frame of vehicle 1. Body 2 has a bottom plate 26 upon which cargo bed 10 sits and two side panels 3 to constrain opposite sides of cargo bed 10 from lateral movement on bottom plate 26. In another embodiment, side panels 3 may contribute to the structure of side walls 103, 105 of cargo bed 10, be added for cosmetic purposes, or be removed. In the open topped configuration of FIGS. 1-4, cargo bed 10 is rectangular and includes a front wall 101, two sidewalls 103, 105 and a pivotable tailgate 11 for hauling cargo. As shown in FIG. 9, cargo bed 10 is divided into halves, namely, foremost portion 10a and rear portion 10b. Front portion 10a has a front wall 101 attached to sidewalls 103, 105, while rear portion 10b includes tailgate 11 opposing front wall 101 of foremost portion 10a and two side walls 103, 105.

Various portions of cargo bed can be molded as integral units. Foremost portion 10a, which includes front wall 101 and sidewalls 103, 105 can be molded as an integral unit. Rear portion 10b, which includes two side walls 103, 105 can be molded as an integral unit and configured to receive tailgate 11.

Vehicle 1 also includes two stowable rear seats 8a, 8b, which are shown in FIGS. 33-36. FIG. 1 shows rear seat 8b in the stowed positioned. 8a is also in the stowed position, but is not visible in FIG. 1.

Figures 5, 7:
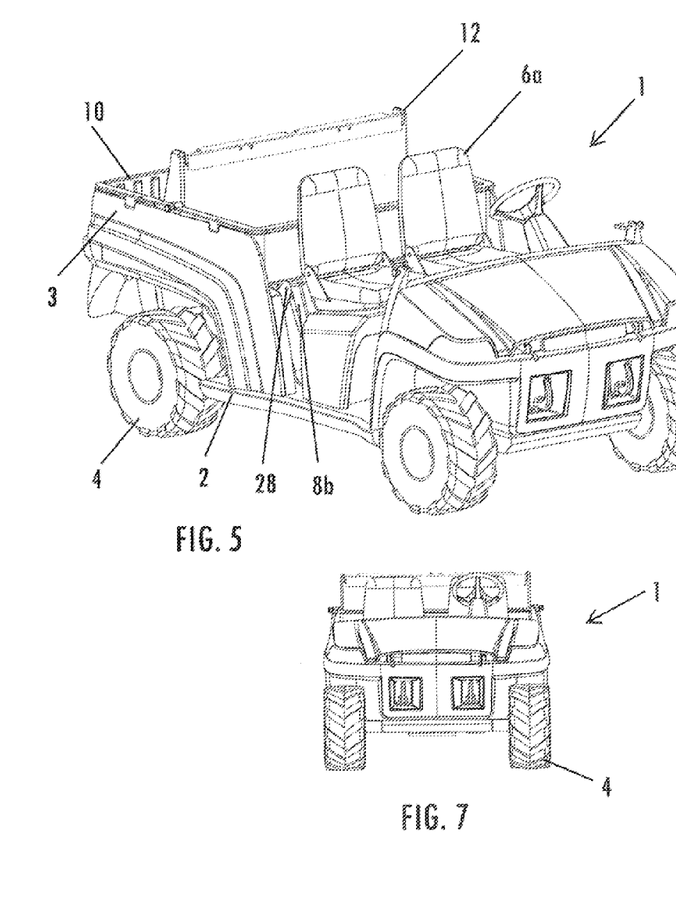
FIG. 5 is a perspective view of the multi-purpose vehicle of FIG. 1 with the bulkhead in an intermediate position in the cargo bed.
FIG. 7 is a front view of the invention shown in FIG. 5.
Figure 6:
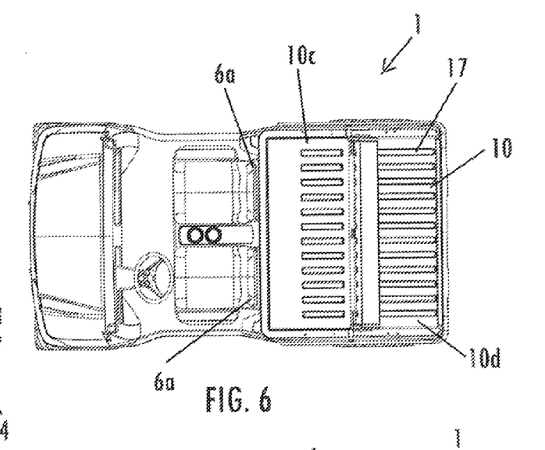
FIG. 6 is a top view of the invention shown in FIG. 5.
Figure 8:
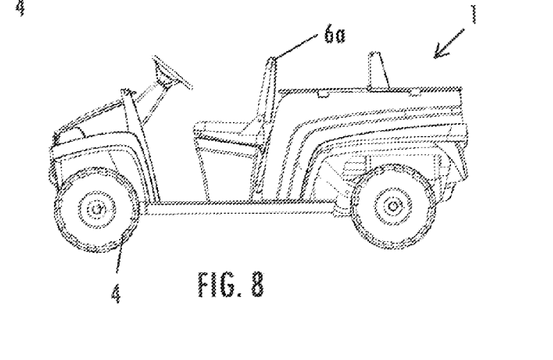
FIG. 8 is a left side view of the invention shown in FIG. 5.
Figure 25:
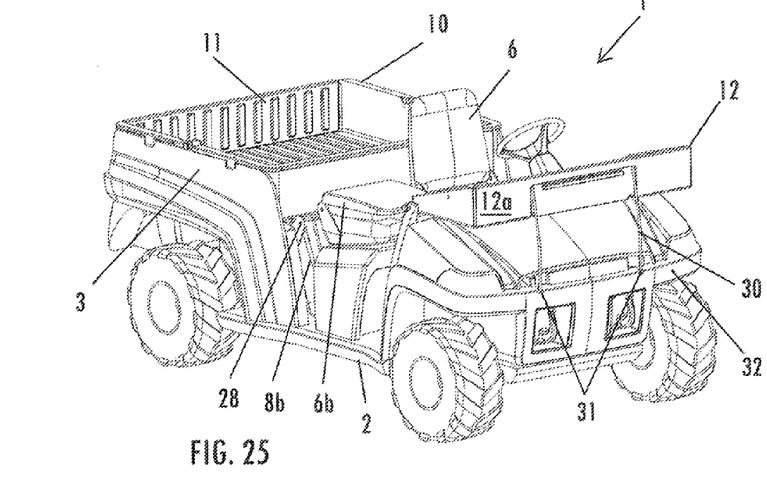
FIG. 25 is a perspective view of the invention shown in FIG. 1 with the bulkhead moved to the front of the vehicle to create a long platform for hauling.
Figure 45:
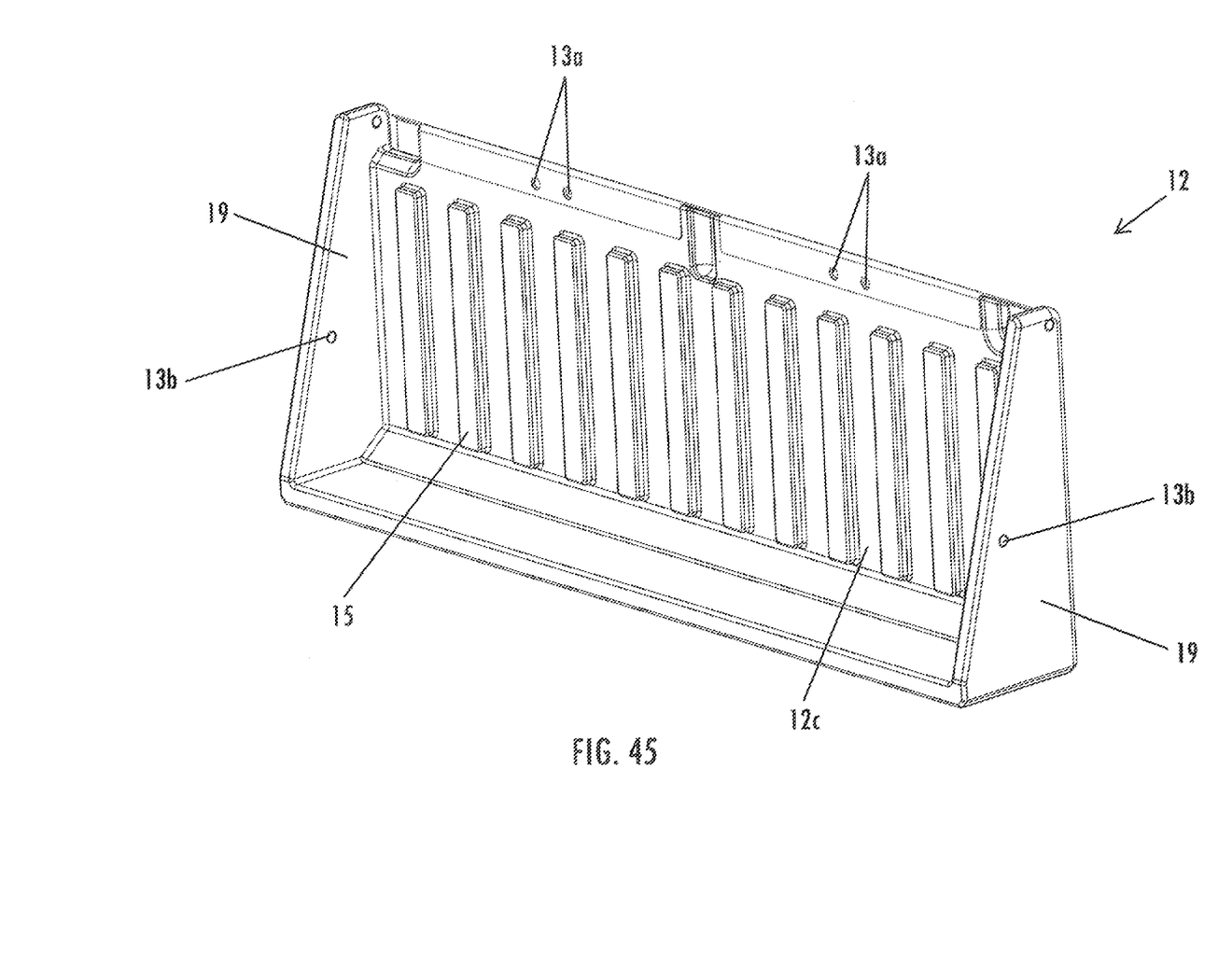
FIG. 45 is a perspective view of the bulkhead shown in FIGS. 1-44.

FIG. 45 shows a removable and repositionable bulkhead 12 that quickly adapts vehicle 1 for a wide range of tasks without the need for tools. Bulkhead 12 can function as divider for cargo bed 10, as shown in FIG. 5, as a back wall for a container 14, as shown in FIG. 17, as a platform on the front of vehicle 1 to extend the length of the hauling surface, as shown in FIG. 25, or as work bench detachably joined to the side of cargo bed 10, as shown in FIG. 29.

Figure 26:
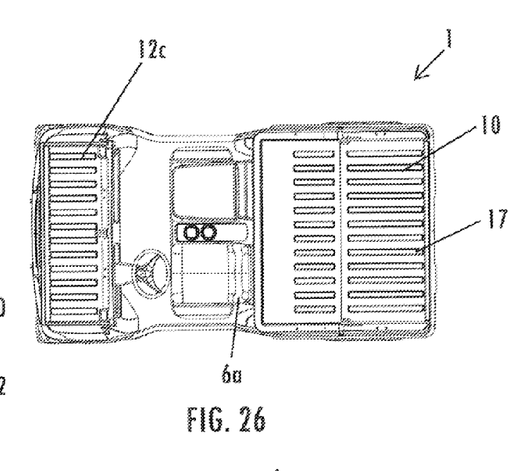
FIG. 26 is a top view of the invention shown in FIG. 25.
Figure 27:
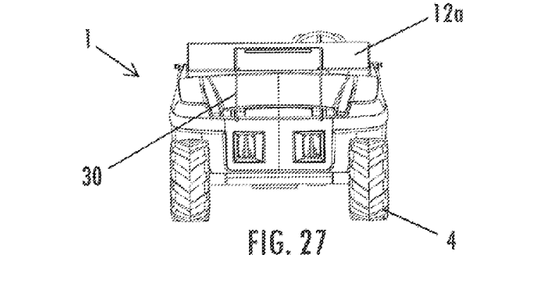
FIG. 27 is a front view of the invention shown in FIG. 25.
Figure 28:
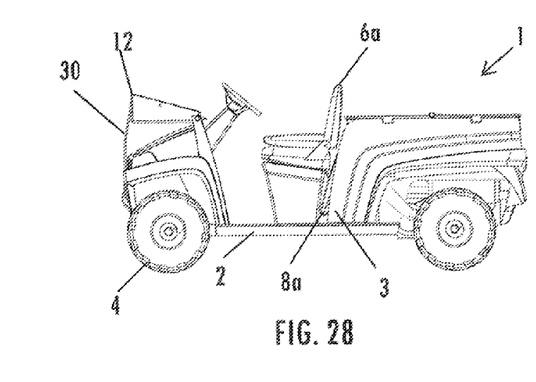
FIG. 28 is a left side view of the invention shown in FIG. 25.
Figure 29:
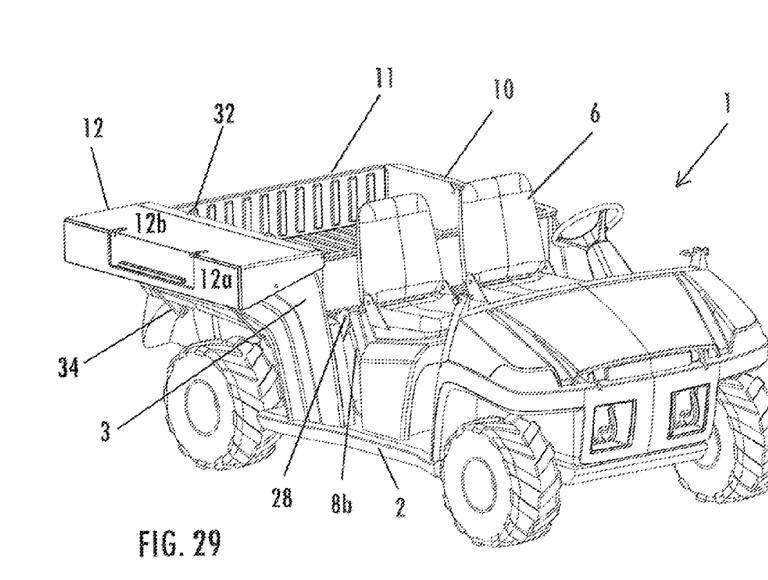
FIG. 29 is a perspective view of the invention shown in FIG. 1 with the bulkhead joined to the side of the cargo bed and positioned over one of the rear wheels to create a work bench.
Figure 30:
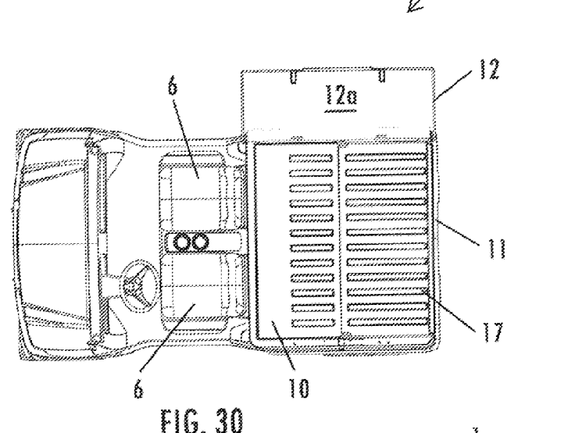
FIG. 30 is a top view of the invention shown in FIG. 29.
Figure 31:
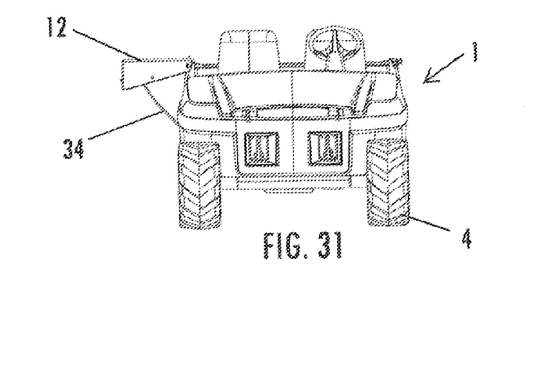
FIG. 31 is a front view of the invention shown in FIG. 29.
Figure 32:
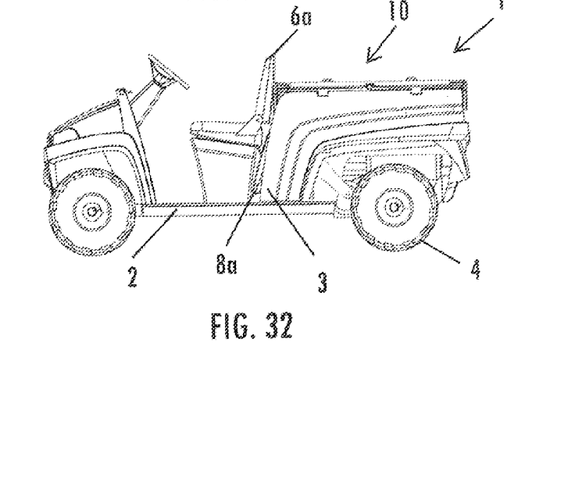
FIG. 32 is a left side view of the invention shown in FIG. 29.
Figure 42:
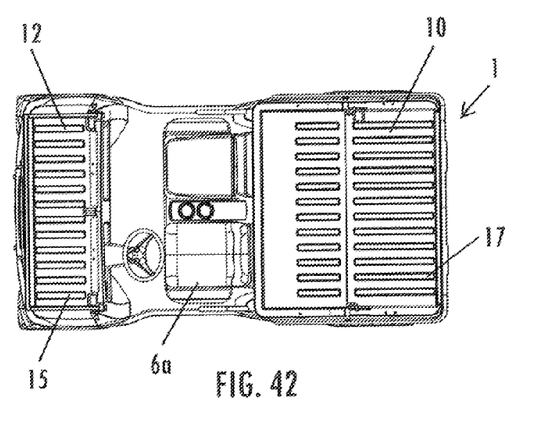
FIG. 42 is a top view of the invention shown in FIG. 41.
Figure 43:
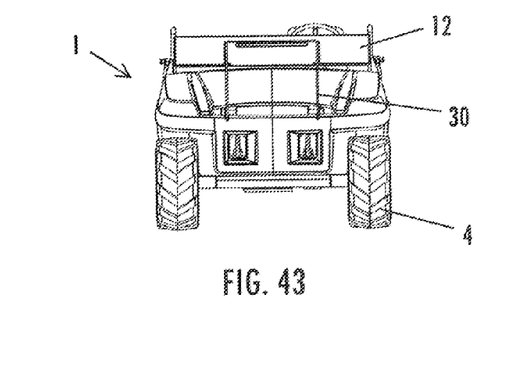
FIG. 43 is a front view of the invention shown in FIG. 41.
Figure 44:
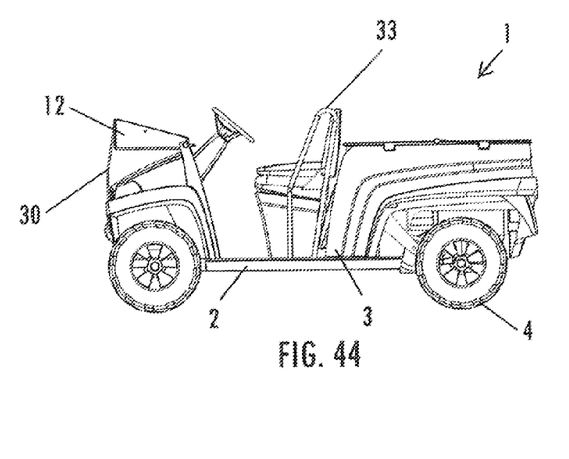
FIG. 44 is a left side view of the invention shown in FIG. 41.

Referring to FIG. 29, bulkhead 12 has a right-triangular-shaped profile with a bottom surface 12a defining a short leg of the triangle and a flat side surface 12b defining a long leg of the triangle, together forming the two sides opposite the hypotenuse leg of the triangle. Bottom surface 12a and flat side surface 12b are bounded on opposite sides by a pair of side walls 19. Referring to FIGS. 25 and 26, the side opposite flat side surface 12b is an inner surface 12c. Referring to FIG. 42, inner surface 12c includes stiffening ribs 15 formed in the surface similar to ribs 17 of sections 10b and 10a of cargo bed 10.

FIG. 1 shows movable bulkhead 12 positioned behind front seats 6 at the foremost end of cargo bed 10. In this position, bulkhead 12 separates front seats 6 from the contents contained within cargo bed 10. In an intermediate position, as shown in FIG. 5, bulkhead 12 is repositioned near the middle of cargo bed 10 to function as a divider to separate cargo into two compartments 10c and 10d.

Figure 13:
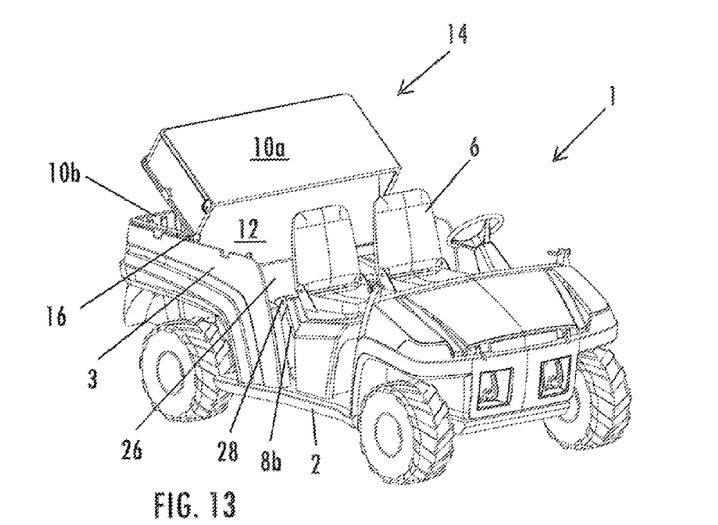
FIG. 13 is a perspective view of the invention shown in FIG. 9 with the cargo bed nearly converted into a container.
Figure 14:
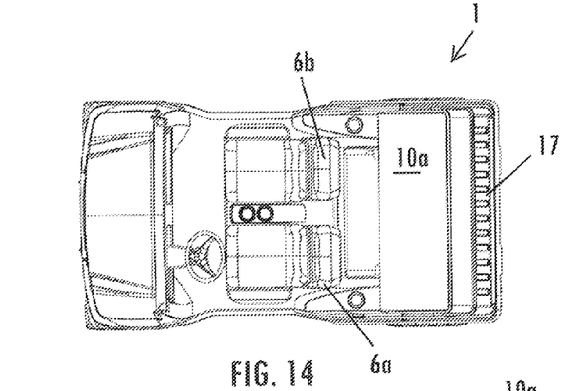
FIG. 14 is a top view of the invention shown in FIG. 13.
Figure 15:
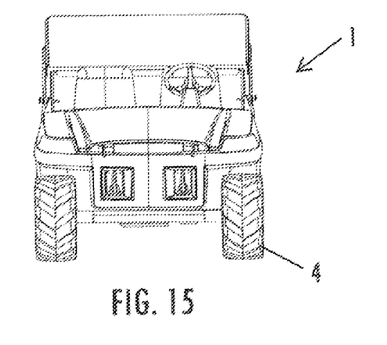
FIG. 15 is a front view of the invention shown in FIG. 13.
Figure 16:
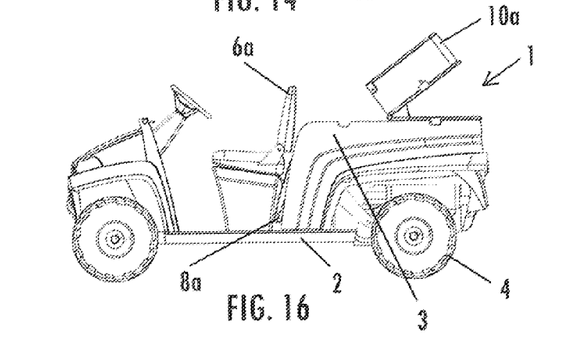
FIG. 16 is a left side view of the invention shown in FIG. 13.
Figures 17, 19:
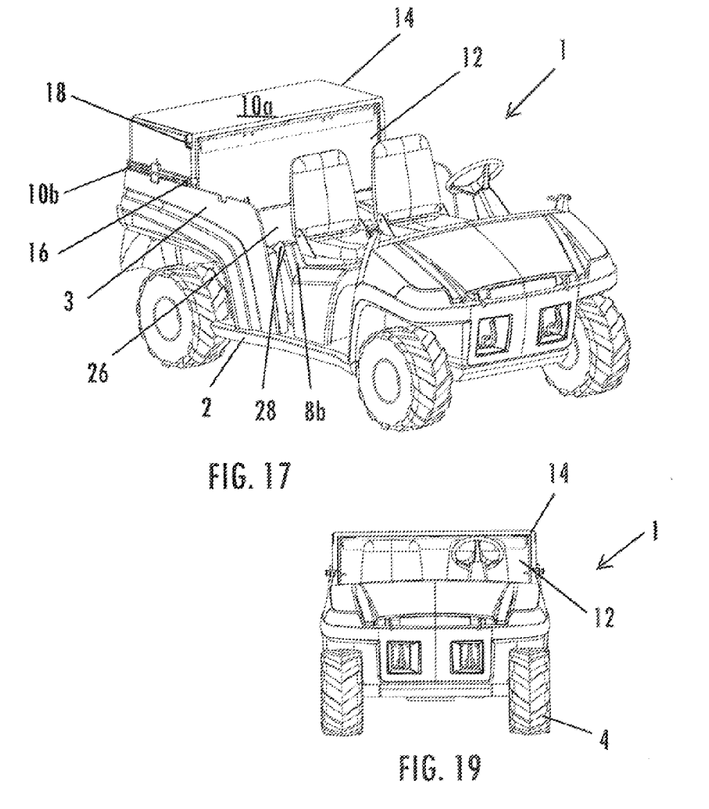
FIG. 17 is a perspective view of the invention shown in FIG. 5 with the cargo bed converted into a container.
FIG. 19 is a front view of the invention shown in FIG. 17.
Figure 18:
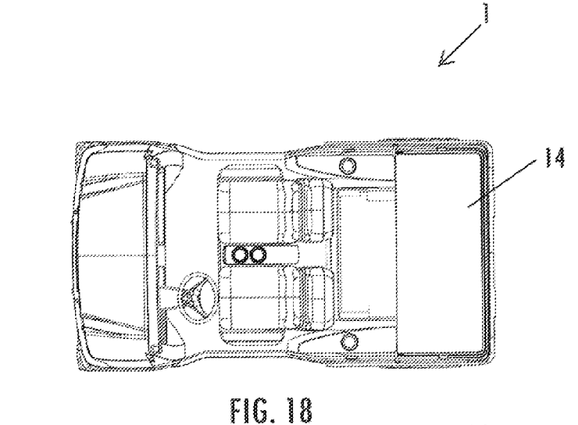
FIG. 18 is a top view of the invention shown in FIG. 17.

FIGS. 9-20 show cargo bed 10 as a foremost portion 10a rotates upward onto a rear portion 10b to create an enclosed trunk for holding and locking cargo secure in a weather protected and lockable container 14. Foremost and rear portions 10a, 10b, respectively, are pivotally attached to one another by a pivot point 16. An operator can pivot front section 10a upward, as shown in FIG. 9 over bulkhead 12 where it is shown positioned in the intermediate position. FIG. 13 shows foremost portion 10a as it is being folded onto rear portion 10b over the top of bulkhead 12. FIG. 17 shows foremost or top portion 10a on top of rear or bottom portion 10b forming closed container 14. Cargo bed 10 is located with respect to side panels 3 of body 2 in a pair of notches 5 on each side panel 3. A pair of blocks 7 are positioned on each foremost portion 10a and rearmost portion 10b of cargo bed 10. Blocks 7 fit within notches 5 to locate cargo bed 10 in body 2.

Figure 21:
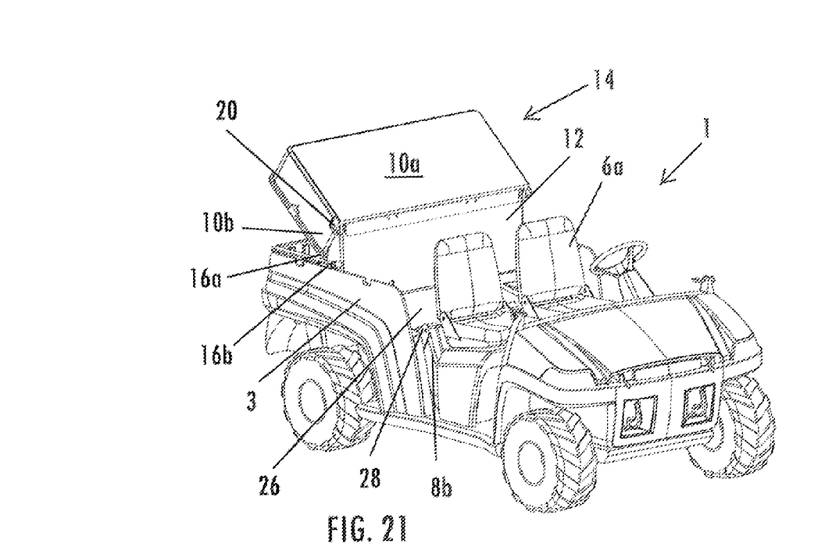
FIG. 21 is a perspective view of the invention shown in FIG. 17 with the top of the container rotative about the top of the bulkhead.
Figure 22:
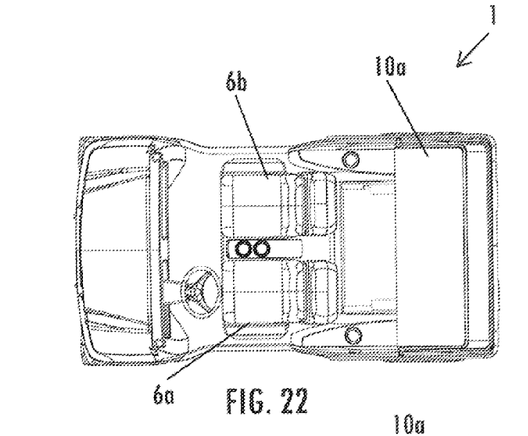
FIG. 22 is a top view of the invention shown in FIG. 21.
Figure 23:
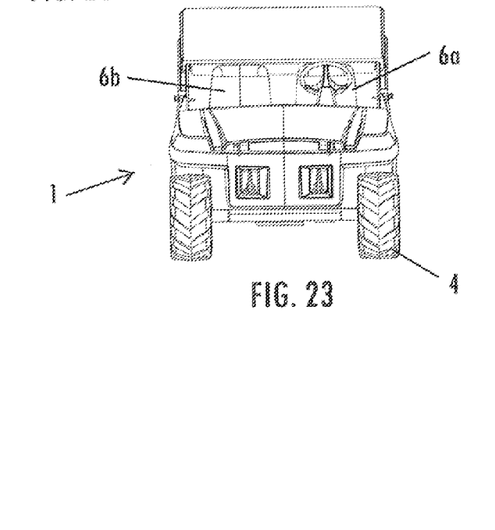
FIG. 23 is a front view of the invention shown in FIG. 21.
Figure 24:
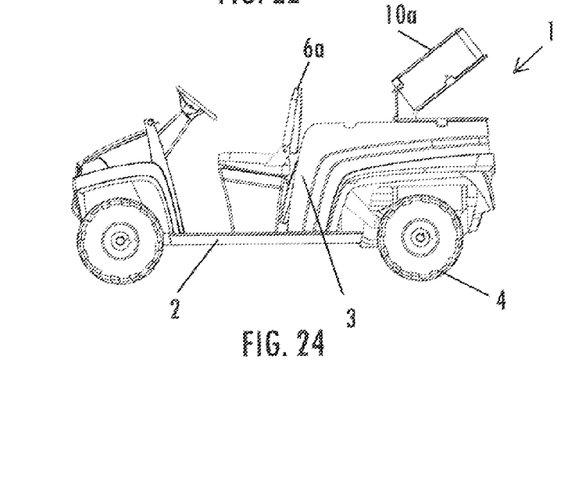
FIG. 24 is a left side view of the invention shown in FIG. 21.

Cargo can be placed in closed container 14 in a couple of ways. The operator can either open tailgate 11 or unhinge top portion 10a from bottom portion 10b of container 14, as shown in FIG. 21. Tail gate 11 has a locking mechanism that engages top portion 10a to hold the two portions together. The operator can unlock the lock on tail gate 11 and either open tail gate 11 or pivot top portion 10a upward on pivot pin 16. Alternatively, top portion 10a may be disengaged from bottom portion 10b by removing pin 16. Pin 16 may then be reinstalled in alternate location at top of bulkhead 12, effectively moving the hinge axis for container 14 to the top of bulkhead 12 to preserve the space between container 14 and rear seats 8 for other uses. See FIGS. 21-24. Pin 16 can be connected to a locking mechanism so container 14 cannot be accessed without an appropriate unlocking means.

Figure 33:
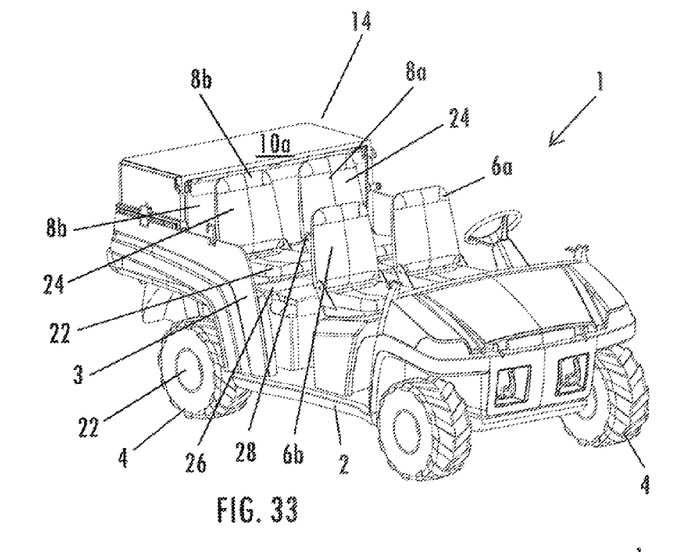
FIG. 33 is a perspective view of the invention shown in FIG. 17 with the rear seats unfolded for carrying additional passengers.
Figure 34:
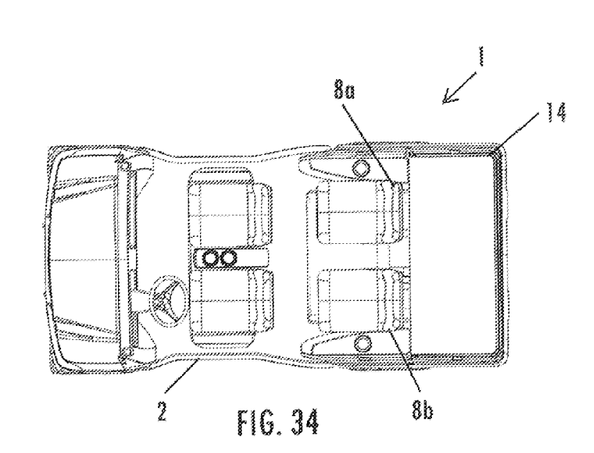
FIG. 34 is a top view of the invention shown in FIG. 33.
Figure 35:
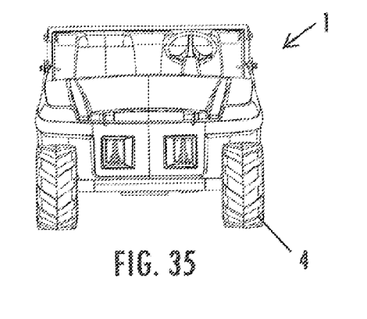
FIG. 35 is a front view of the invention shown in FIG. 33.
Figure 36:
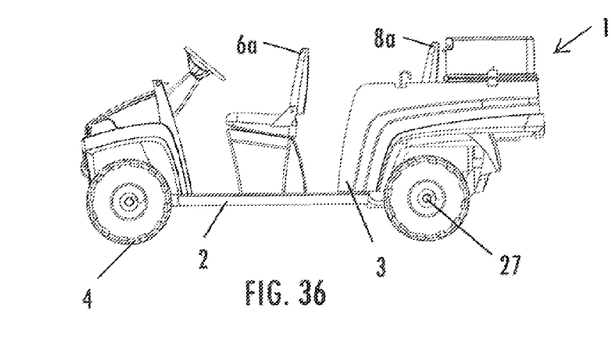
FIG. 36 is a left side view of the invention shown in FIG. 33.

With top portion 10a on top of bottom portion 10b, and sliding the back portion of the cargo bed away from rear axle center point, the rear seats 8a, 8b can be un-stowed to accommodate additional passengers. FIG. 33 shows rear seats 8a, 8b in the deployed position. Rear seats 8a, 8b include a bottom portion 22 upon which a passenger may sit, and a backrest portion 24 configured to support the passenger's back. Bottom portion 22 is supported in the deployed configuration by a bottom plate 26 of body 2, as shown in FIG. 17. A lower end of the backrest portion 24 is pivotally mounted at a pivot point 28 to a rear end of bottom portion 22, such that the backrest portion 24 may be folded forward by a user to lie in a substantially flat intermediate position on top of bottom portion 22. A rear end of bottom portion 22 is on a pivotable arm connected to pivot point 28 and to body 2 of vehicle 1, so that pivot point 28 moves with rear seats 8 as rear seats 8 rotate from a generally flat position near bulkhead 12 to a generally vertical position in the foot rest area behind front seats 6. Backrest portion 24 pivots generally one-hundred and eighty degrees between the upright position and the stowed position. Referring back to FIG. 1, rear seats 8 are shown rotated to the vertical position stowed in the foot rest area behind front seats 6. Pivot point 28 is shown rotated forward toward front seats 6.

Figure 37:
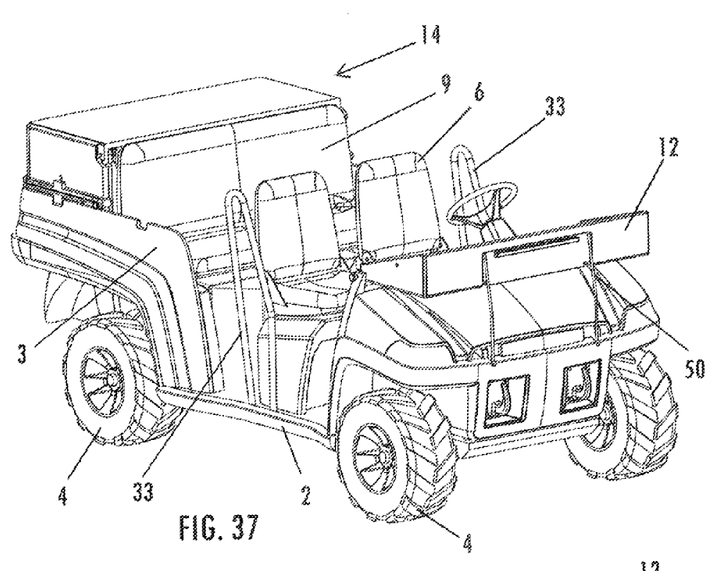
FIG. 37 is a perspective view of an alternative embodiment with a bench style rear seat.
Figure 38:
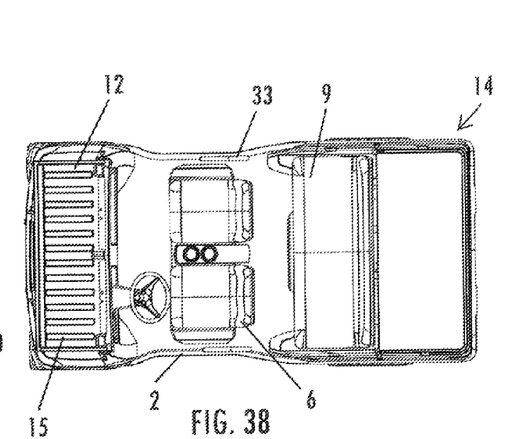
FIG. 38 is a top view of the invention shown in FIG. 37.
Figure 39:
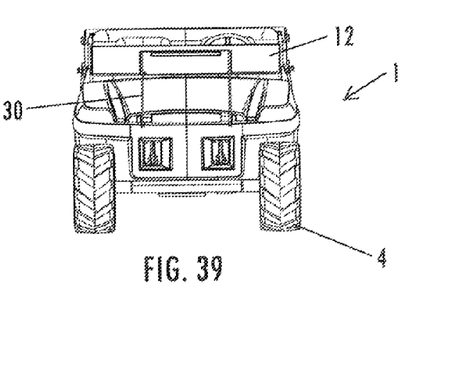
FIG. 39 is a front view of the invention shown in FIG. 37.
Figure 40:
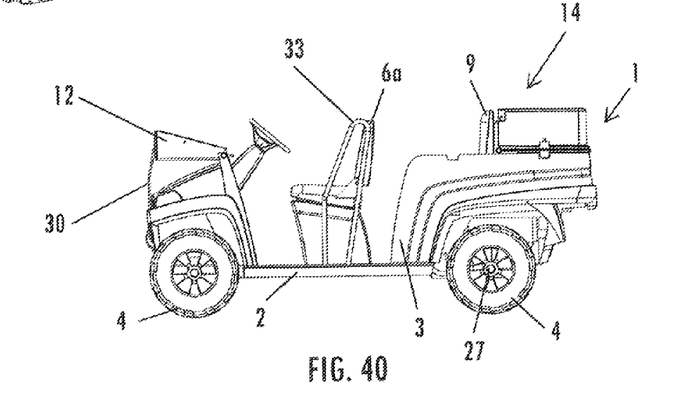
FIG. 40 is a left side view of the invention shown in FIG. 37.
Figure 41:
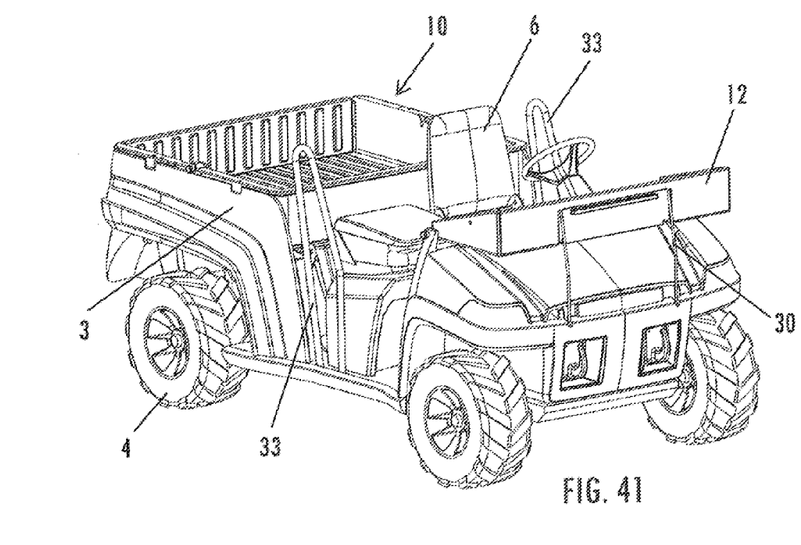
FIG. 41 is a perspective view of the invention shown in FIG. 25 with handles attached to the body of the vehicle.

FIG. 37 shows an alternative embodiment where rear seats 8a, 8b are replaced with a stowable bench 9. Bench 9 has a single back section that extends generally the length and height of bulk head 12, and thus can replace bulk head 12 as the rear wall of container 14. This allows bulk head 12 to be used in other positions on vehicle 1. Bench 9 can also accommodate an additional passenger. Bench 9 is mounted in a manner similar to rear seats 8, and folds to a generally vertical position stowed in the foot rest area behind front seats 6. A lower end of the backrest portion of bench 9 is pivotally mounted at a pivot point to a rear end of bottom portion of bench 9, such that the backrest portion of bench 9 may be folded forward by a user to lie in a substantially flat intermediate position on top of the bottom portion of bench 9. A rear end of the bottom portion of bench 9 is on a pivotable arm connected to pivot point and to body 2 of vehicle 1, so that pivot point moves with bench 9 as bench 9 rotates from a generally flat position to a generally vertical position in the foot rest area behind front seats 6.

Figure 20:
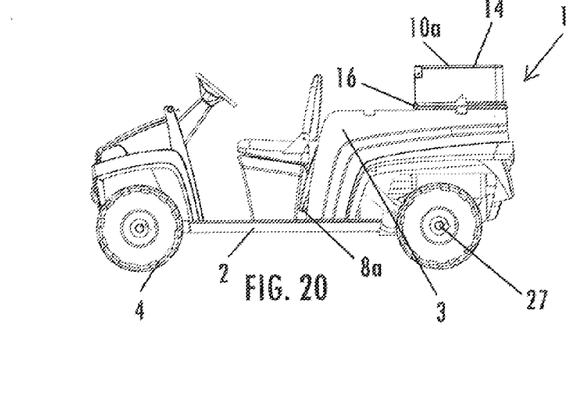
FIG. 20 is a left side view of the invention shown in FIG. 17.

Cargo bed platform 26 and side rails 103, 105 may be supported on rails (not illustrated) on frame 2 so that the cargo bed support platform 26 can be shifted rearward with respect to the rear wheels 4, as seen in FIGS. 33-40. Cargo bed 10/container 14 is slideably mounted to the frame of vehicle 1. Cargo bed 10/container 14 slides on frame 2 by an appropriate means. FIG. 33 shows container 14 and side panels moved rearward with respect to rear axle center line 27. From another perspective, the distance between tail gate 11 and rear axle center line 27 is greater than the distance between the two, as shown in FIG. 20. The space created by repositioning container 14 with respect to rear axle center line can be used for a variety of needs such as providing the required space for the rear seats, addition of accessories such as coolers, additional compartments, and other hauling/storage purposes. FIG. 25 shows bulkhead 12 repositioned onto the hood of vehicle 1 with inner surface 12c facing upward to create an extended inline surface to function as a dashboard for placing items or for carrying long cargo, such as a ladder. In this configuration, rear seats 8 are stowed, passenger front seat 6b is folded down, and cargo bed 10 is exposed. The top rim of cargo bed 10 is generally the same height from the ground as inner surface 12c of bulkhead 12 when inner surface 12c is positioned facing upward on the hood of vehicle 1. Two support members 30 extend downward from bulkhead 12 and attach to brackets 31 on bumper 32 of vehicle 1 to support bulkhead 12. Support members 30 may be attached to bulk head 12 and rotate down when needed or they may be provided separately and attached when needed.

FIGS. 37-44 also shows bulkhead 12 positioned in the manner described with respect to FIG. 25. FIGS. 37-44 show handles 33 positioned off the side of front seats 6 for passengers to grasp to assist entry and debarking or to act as a side restraint for long cargo to prevent it from sliding off the side.

FIG. 29 shows bulkhead 12 repositioned with flat side surface 12b facing upward off the side of cargo bed 10 to function as a workbench. The top end of bulkhead 12 is attached to the upper rim of cargo bed 10 by a pair of u-shaped bolts 32. A support member 34 attaches to the bottom of bottom surface 12a and to the underside of the wheel well of vehicle 1. Support member 34 may be attached to bulk head 12 and rotated down or provided separately and attached when needed. Support member 34 could also be the same support member 30 used at the front of vehicle 1 to support bulkhead 12 as the extended surface for carrying long cargo. This configuration provides a convenient and stable working platform for the operator.

FIG. 45 shows bulkhead 12. Bulkhead 12 and cargo bed 10 are attached to the various positions by pins or u-shaped bolts. Holes 13 in bulkhead 12 align with holes in cargo bed 10, its sections 10a, 10b, or vehicle 1 to receive the u-shaped bolts and hold bulkhead 12 secure thereto. More specifically, two pairs of first holes 13a are positioned near a top edge of flat side surface 12b and inner surface 12c, and extend therethrough. A pair of second holes 13b are provided with a second hole 13b positioned in each one of opposing side walls 19. Other ways to secure bulkhead 12, cargo bed 10, and the other attachments to vehicle 1 in a manner that allows the same to be quickly removed and repositioned without the need of tools are also contemplated. For example, any type of fastener can be used. Also, bulk head 12 could be formed with protrusions to mate with groves in cargo bed 10 such that bulk head 12 could be slid into position secure in the groove to eliminate the need for fasteners. In one embodiment, a U-shaped fastener with one leg longer than the other leg is used. The longer leg is threaded to correspond with threaded holes in cargo bed 10, its sections 10a, 10b, or vehicle 1.

In an alternative embodiment, attachment points on vehicle 1 for receiving bulkhead 12 can be used to attach a roll-over protection system (ROPS) or bulkhead 12 could be attached to support members of the ROPS. A wind shield could also be added to the front of vehicle 1 where bulkhead 12 attaches. Various other configurations and accessories can be implemented into vehicle 1 without departing from the scope of the invention.

While the present invention has been particularly shown and described with reference to illustrated embodiments thereof, it should be understood by those of ordinary skill in the art that various changes, substitutions and alterations could be made herein without departing from the scope of the invention as defined by appended claims and their equivalents. The invention can be better understood by reference to the following claims. For purpose of claim interpretation, the transitional phrases "including" and "having" are intended to be synonymous with the transitional phrase "comprising".

What is claimed is:

1. In a vehicle having a driver's seat, a steering wheel, and a generally horizontal platform disposed rearward from the driver's seat, an improved cargo bed therefor comprising:
    a first cargo bed component comprising a floor, opposing upstanding sidewalls, and an upstanding endwall between the opposing upstanding sidewalls;
    a second cargo bed component comprising a floor, opposing upstanding sidewalls, and a front wall between the opposing upstanding sidewalls, wherein the second cargo bed component is selectively pivotable around a free end of each opposing sidewall of the first cargo bed component to a position on top of the first cargo bed component forming a container with an open side; and
    a bulkhead member having a first surface perpendicular to an end wall, and an inner surface opposing the first surface, wherein the bulkhead member is selectively positionable with the first surface of the bulkhead at an end of the opposing upstanding sidewalls of the first cargo bed component and the second cargo bed component pivots around the free end of each opposing sidewall of the first cargo bed component and pivots over the bulkhead member to a position with the first surface positioned at an end of the opposing upstanding sidewalls of the second cargo bed component to form a rear wall that fits in the open side of the container.

2. The cargo bed of claim 1, wherein the bulkhead is further selectively moveable to a position overlying a rear wheel of the vehicle with a longitudinal end opposite from a bottom surface of the bulkhead removably secured to an upper rim of the cargo bed.

3. In a vehicle having a driver's seat, a steering wheel, and a generally horizontal platform disposed rearward from the driver's seat, an improved cargo bed therefor comprising:
    a first cargo bed component comprising a floor and opposing upstanding sidewalls;
    the first cargo bed component further comprising an upstanding endwall;
    a second cargo bed component comprising a floor, opposing upstanding sidewalls, and a front wall between the opposing upstanding sidewalls, wherein the second cargo bed component pivots 180 degrees from a first position with the floor co-planar with the floor of the first cargo bed component to a second position upside down with the floor above the floor of the first cargo bed component forming an enclosed container with an open side; and
    a bulkhead member having a first surface perpendicular to an end wall, and an inner surface opposing the first surface, wherein the bulkhead is selectively disposable upon a hood of the vehicle and retained to brackets disposed at opposing ends of a rear of the hood and forward of the driver's seat and positionable in the open side of the enclosed container.

4. The cargo bed of claim 1, wherein the bulkhead functions as one chosen from a subdivider of the cargo bed into compartments, a writing surface attached to a side of one of the first and the second cargo bed components, and an extension of the cargo bed of the vehicle.

5. A cargo bed comprising:

a first cargo bed component comprising a floor, opposing upstanding sidewalls, and an upstanding end wall between the opposing upstanding sidewalls;

a second cargo bed component comprising a floor, opposing upstanding sidewalls, and a front wall between the opposing upstanding sidewalls, wherein the second cargo bed component pivots 180 degrees from a first position with the floor co-planar with the floor of the first cargo bed component to a second position upside down with the floor above the floor of the first cargo bed component forming an enclosed container with an open side; and a bulkhead member having a first surface, wherein the bulkhead member is selectively positionable with the first surface of the bulkhead positioned at an end of the opposing upstanding sidewalls of the first cargo bed component and at an end of the opposing upstanding sidewalls of the second cargo bed component forming a rear wall that fits in the open side.

6. The cargo bed of claim 5, wherein when the second cargo bed component is in the second position, each one of the opposing upstanding sidewalls of the first cargo bed component is coplanar with one of the opposing upstanding sidewalls of the second cargo bed component so that the opposing upstanding sidewalls of the first cargo bed component and the opposing upstanding sidewalls of the second cargo bed component form two opposing sidewalls of the enclosed container.

7. The cargo bed of claim 5, and further comprising a vehicle having a generally horizontal platform disposed rearward from a driver's seat, wherein the cargo bed is combined to the horizontal platform, wherein the bulkhead is further selectively moveable to a position overlying a rear wheel of the vehicle with a longitudinal end opposite from a bottom surface of the bulkhead removably secured to an upper rim of the cargo bed.

8. The cargo bed of claim 5, and further comprising a vehicle having a generally horizontal platform disposed rearward from a driver's seat wherein the bulkhead is selectively disposable upon a hood of the vehicle and retained to brackets disposed at opposing ends of a rear of the hood and forward of the driver's seat.

9. The cargo bed of claim 1, wherein the bulkhead functions as one chosen from a subdivider of the cargo bed into compartments, a writing surface attached to a side of one of the first and the second cargo bed components, and an extension of the cargo bed of the vehicle.

* * * * *